United States Patent [19]

Hagemeyer et al.

[11] Patent Number: 6,074,979
[45] Date of Patent: Jun. 13, 2000

[54] POLYBETAINE-STABILIZED, PALLADIUM-CONTAINING NANOPARTICLES, A PROCESS FOR PREPARING THEM AND ALSO CATALYSTS PREPARED FROM THEM FOR PRODUCING VINYL ACETATE

[75] Inventors: Alfred Hagemeyer, Frankfurt; Uwe Dingerdissen, Seeheim-Jugenheim; Hans Millauer, Eschborn; Andreas Manz, Sinzheim; Klaus Kühlein, Kelkheim, all of Germany

[73] Assignee: Celanese GmbH, Frankfurt, Germany

[21] Appl. No.: 09/083,008

[22] Filed: May 21, 1998

[30] Foreign Application Priority Data

May 23, 1997 [DE] Germany .......................... 197 21 601

[51] Int. Cl.⁷ .............................. B01J 31/00; B01J 23/44; B01J 23/40; B01J 23/58
[52] U.S. Cl. .......................... 502/159; 502/326; 502/330; 502/339
[58] Field of Search ...................... 502/159, 339

[56] References Cited

U.S. PATENT DOCUMENTS 5,985,785   11/1999   Lane et al. .............................. 502/159

FOREIGN PATENT DOCUMENTS 44 43 705    6/1996   Germany .
WO 96/17685  6/1996   WIPO .

*Primary Examiner*—Mark L. Bell
*Assistant Examiner*—J. Pasterczyk
*Attorney, Agent, or Firm*—Frommer Lawrence & Haug LLP

[57] ABSTRACT

Polybetaine-stabilized, palladium-containing nanoparticles, a process for preparing them and also catalysts prepared from them for producing vinyl acetate. The invention relates to soluble nanoparticles which comprise palladium alone or palladium together with metals of the groups 8–11 of the periodic table and which are embedded in protective colloids, wherein the protective colloids comprise at least one polymer having betaine groups, and to a process for preparing them. The soluble nanoparticles are suitable for the preparation of catalysts.

32 Claims, No Drawings

POLYBETAINE-STABILIZED, PALLADIUM-CONTAINING NANOPARTICLES, A PROCESS FOR PREPARING THEM AND ALSO CATALYSTS PREPARED FROM THEM FOR PRODUCING VINYL ACETATE

Polybetaine-stabilized, palladium-containing nanoparticles, a process for preparing them and also catalysts prepared from them for producing vinyl acetate.

The invention relates to soluble nanoparticles which comprise palladium alone or palladium with metals of the groups 8–11 of the periodic table, and are stabilized by protective colloids, and to a process for preparing them by the sol process. The invention furthermore relates to catalysts prepared from the abovementioned nanoparticles for producing vinyl acetate.

The catalytic conversion of ethylene, oxygen and acetic acid into vinyl acetate, the starting monomer for an economically important group of polymers, is carried out on the industrial scale in tube bundle reactors with heterogeneous catalysis in the gas phase. The catalysts used for this comprise as catalytically active constituent palladium-containing particles immobilized on an inert carrier material.

Heterogeneous catalysts generally consist of an inert, porous carrier, such as moldings, loose material or powder, and the catalytically active components, which are located on the surface and in the pores of the carrier. When preparing such catalysts, it is important to form as many active centers as possible, i.e. to apply the catalytically active components in fine dispersion to the carrier, and attach them as firmly as possible to the outer and inner surface of the carrier at the points accessible to the reactants.

Various processes for preparing catalysts based on palladium have already been described for the preparation of vinyl acetate. Different active components and preparation techniques are employed for this:

U.S. Pat. No. 3,743,607 and GB-A 1 333 449 disclose the preparation of Pd/Au supported catalysts for vinyl acetate synthesis by impregnation of the carrier with Pd/Au salts and subsequent reduction. This does not produce shell-type catalysts; on the contrary, the noble metals are distributed uniformly over the entire cross-section of the pellets.

EP-A 0 519 436 discloses Pd/Ba/K catalysts.

U.S. Pat. No. 4,158,737 and U.S. Pat. No. 4,119,567 disclose Pd/Au on $\alpha$-$Al_2O_3$ carriers, and U.S. Pat. No. 4,188,490 discloses Pd on ZnO carriers.

U.S. Pat. No. 5,336,802 discloses pretreatments of Pd/Au catalysts by several sequential oxidation and reduction steps.

DE-A 25 09 251 discloses a process for drying the catalysts and DE-A 25 06 141 discloses a process for activating the catalyst in the startup phase.

EP-A 0 403 950 discloses carriers with defined pore radius distributions.

EP-A 0 431 478 discloses the compression of carrier particles to moldings with the aid of carboxylates as binders.

U.S. Pat. No. 5,371,277 and EP-A 0 464 633 disclose carrier shapes with a through channel (for example annular tablets) and EP-A 0 330 853, DE-A 38 03 900 disclose moldings consisting of cylindrical particles with convex faces and EP-A 0 004 079 discloses moldings consisting of ribbed extrudates or star-shaped extrudates.

EP-A 0 048 946 discloses chlorine compounds as feed additives to reduce the total oxidation of ethylene to $CO_2$.

EP-A 0 012 968 discloses a reaction procedure where the molar ratio of acetic acid to oxygen in the feed is greater than 2:1.

Frequently also used for the production of vinyl acetate are shell-type catalysts. In this case, the catalytically active metals are deposited in the form of a shell on or in the outermost layer of the carrier. They are in part prepared by penetration of metal salts into the carrier as far as a zone near the surface and subsequent precipitation by alkalis to give Pd/Au compounds which are insoluble in water:

GB-A 1 283 737 discloses the preparation of a noble metal shell-type catalyst by initial impregnation of the carrier with an alkaline solution and saturation with 25–90% water or alcohol. Subsequent impregnation with Pd salts and reduction of the deposited salts to the metal affords shell-type catalysts, the intention being that the depth of penetration of the noble metals being up to 50% of the pellet radius.

U.S. Pat. No. 3,775,342 discloses shell-type catalysts prepared by impregnating the carrier with a solution of Pd/Au salts and with an aqueous base, preferably NaOH, there being precipitation of insoluble Pd and Au hydroxides in a shell-like surface zone on the pellets. The hydroxides immobilized in this way in the shell are then reduced to the metals.

U.S. Pat. No. 4,048,096 discloses the precipitation of Pd and Au compounds which are insoluble in water onto the carrier which has been initially impregnated with Pd/Au salts, using Na silicates in place of NaOH. The thickness of the shell resulting in this case is less than 0.5 mm.

EP-A 0 519 435 discloses the preparation of a Pd/Au/K or Pd/Cd/K shell-type catalyst, wherein a special carrier material is washed with an acid before the impregnation and it is treated with a base after the impregnation.

U.S. Pat. No. 5,314,858 discloses double immobilization of the noble metals in an outer shell by two separate NaOH precipitation steps.

EP-A 0 723 810 discloses a pretreatment (impregnation) of the carrier with Al, Zr or Ti-containing metal salt solutions, which carrier is subsequently employed for the base precipitation described above to form a Pd/Au/K shell-type catalyst.

Another method for producing shell-type catalysts consists of prenucleation with metals and subsequent deposition of the intended amount of the noble metals:

JP-A 48-10135 discloses the preparation of a Pd/Au shell-type catalyst. In this case, a small amount of reduced metal (gold) is deposited on the porous carrier in a pretreatment step. Pd is deposited by subsequent impregnation in a surface zone in a thickness of about 15% of the particle radius.

U.S. Pat. No. 4,087,622 describes the preparation of shell-type catalysts by prenucleation with (reduced) Pd/Au metal nuclei in low concentration by impregnating the porous $SiO_2$ or $Al_2O_3$ carrier with a Pd/Au salt solution, drying and then reducing the Pd/Au salt to the metal. The prenucleation step is followed by deposition of the amount of noble metal required for the catalysis, that is to say the major quantity, which is then concentrated in a shell near the surface.

It is likewise possible to attain shell-type catalyts by using a deficiency of the impregnation solution in relation to the available pore volume, and by limiting the effective time for taking up the noble metals, in some cases combined with multiple impregnation:

EP-A 0 565 952 discloses the obtaining of Pd/Au/K, Pd/K/Ba and Pd/K/Cd catalysts with a shell-type structure when a solution of corresponding metal salts is atomized by ultrasound and then applied in such a limited amount and within such a limited time to the carrier particles and drying thereof is begun that the catalytically active metal salts cannot penetrate into the carrier particles as far as the core but only into a larger or smaller outer part, called the shell.

Shell-type catalysts are obtained according to EP-A 0 634 214 by spraying a viscous solution of appropriate metal salts in the form of drops or jets of liquid onto the carrier particles, with the volume of solution for each spraying amounting to 5–80% of the pore volume of the carrier particles and the drying being initiated immediately after the spraying.

Shell-type catalysts are obtained according to EP-A 0 634 209 by impregnating the carrier particles with a viscous solution of appropriate metal salts, with the volume of solution for each impregnation step amounting to 5–80% of the pore volume of the carrier particles, and drying being initiated immediately after each impregnation step.

Shell-type catalysts are obtained according to EP-A 0 634 208 by impregnating the carrier particles with a viscous solution of salts of the appropriate elements and then drying, with the volume of solution for the impregnation amounting to more than 80% of the pore volume of the carrier particles, and the duration of the impregnation and the time until drying is begun being chosen to be so short that, after the drying is complete, a shell of 5–80% of the pore volume of the carrier particles contains the said metal salts.

Beyond the wider prior art described above on the preparation of vinyl acetate catalysts, the narrower prior art also discloses methods for preparing heterogeneous catalysts which are distinguished by initially generating, by a sol process, nanoparticles of one or more catalytically active metals in a separate process stage, and subsequently immobilizing these particles on a carrier. The general advantage of the sol process is that a high dispersity of the particles can be achieved, the distribution of particle diameters is narrow, and it is possible to form alloy particles.

General descriptions of this method are to be found, inter alia, in (a) B. C. Gates, L. Guczi, H. Knözinger, Metal Clusters in Catalysis, Elsevier, Amsterdam, 1986; (b) J. S. Bradley in Clusters and Colloids, VCH, Weinheim 1994, pages 459–544;

In nanoparticle-based syntheses of heterogeneous catalysts which do not, however, relate to the preparation of vinyl acetate catalysts, the metal particles are stabilized by using so-called stabilizers or protective colloids, especially when sols amenable to further processing and having a metal concentration of 0.1% or higher are required. Stabilizers or protective colloids envelope the metal particles and, in many cases, confer a stable electric charge on the particles. This prevents agglomeration of the particles.

Examples which may be mentioned of low molecular weight stabilizers are, inter alia, oxygen-, phosphorus-, sulfur- or nitrogen-containing ligands, and cationic, anionic, betaine or nonionic surfactants.

Polymeric protective colloids which have been employed are, inter alia, polyacrylic acid, polyvinyl alcohol or poly (N-vinylpyrrolidone).

Processes for producing hydrosols and organosols of, for example, palladium and gold have been described many times, as have heterogeneous catalysts prepared therefrom:

Journal of Catalysis 1977, 50, 530–540 discloses a synthesis of Pd/Au particles with a diameter of 2–4.5 nanometers, which starts from $[Au(en)_2]^{3+}$ and $[Pd(NH_3)_4]^{2+}$ salts and firstly produces a linkage by ion exchange with the acidic groups of a silica carrier and subsequently reduces the immobilized metal salts.

Catalyst Preparation Science IV, Elsevier Science Publishers, New York 1987, 669–687 discloses the successive reduction or the coreduction of palladium and gold salts using sodium citrate simultaneously as reducing agent and stabilizer. In this case, palladium on gold or gold on palladium particles or Pd/Au alloy particles were obtained. The resulting colloids were immobilized on carbon carriers.

Chem. Eur. J. 1996, 2, 1099–1103 describes shell-type, bimetallic Pd/Au colloids with sizes in the range of 20–56 nanometers and prepared by the nucleus growth method. The stabilizers employed were sulfonated triphenylphosphine and sodium sulfanilate ligands. The resulting particles were immobilized on titanium dioxide carriers.

EP-A 0 672 765 discloses the electrochemical preparation of Pd/Au hydrosols using cationic, anionic, nonionic or betaine stabilizers. In this process, the metal salts are reduced at the cathode of an undivided electrolysis cell. The betaine-stabilized sols described therein require an approximately 5-fold molar excess of stabilizer based on the metal salt and the use of organic solvents.

DE-A 44 43 701 discloses shell-type catalysts which are said to be suitable as heterogeneous catalysts. In this case, the particles are deposited in an outer shell which is up to 200 nanometers thick on the carrier grain. A process for preparing them using a cation-stabilized hydrosol is also claimed.

DE-A 44 43 705 discloses the preparation of surfactant-stabilized metal particles as precursors for hetergeneous catalysts.

DE-A 195 00 366 describes the preparation of shell-type Pd catalysts for hydrogenations by applying the Pd as highly diluted sol to a carrier, by impregnation or spraying, resulting in a shell thickness of less than 5000 nanometers. PVP is employed as stabilizer. The space-time yield and the useful life of Pd/Au catalysts determine the profitability of the vinyl acetate process. However, the best catalysts at present do not adequately satisfy the requirements relating to the conversion, the selectivity and the long-term characteristics. Thus, for example, the conversions in most cases are only about 10%. In addition, there are the costs of the catalyst itself, which are determined by the use of large amounts of the costly noble metals palladium and gold. The processes previously disclosed for preparing catalysts for the vinyl acetate process entail production of the reactive centers by loading the carrier with a solution of compounds of the catalytically active components, for example by impregnation with a solution of salts of the relevant metals. The compounds on the carrier are subsequently converted by a chemical step, for example by precipitation or reduction, into the catalytically active components.

One essential reason for the large requirement for noble metals derives from the impregnation process which has previously been mainly used, and which may entail certain disadvantageous manifestations, as will be explained hereinafter. It can frequently be observed that the particle diameters which can be achieved in the chemical conversion of the palladium and gold compounds on the carrier are greater than 10–20 nanometers. The distribution of particle diameters is usually found to be relatively broad, from about 5 to 100 nanometers. The formation of larger metal particles of from 100 to 200 nanometers is particularly undesirable. This results in a reduction in the catalytic activity as a consequence of the diminution in the specific surface area of metals.

Another problem arises from the difficulty of depositing the palladium and the gold in homogeneous dispersion on the carrier. In practice, gold-rich domains are frequently found on the carrier alongside areas with a balanced Pd/Au ratio. The possible causes of this are nonuniform distribution during the loading process and a difference in behavior during the immobilization process.

It is furthermore known that noble metal catalysts on a carrier suffer a loss of activity on prolonged operation under the usual operating conditions, i.e. at temperatures of about 150 to 170° C. In order to compensate the losses of activity, it is now in practice mandatory to increase the noble metal loading of the carrier appropriately.

The object is thus to develop novel Pd/Au catalysts with improved properties in relation to their particle size, particle distribution, composition and microstructure of the stabilizing matrix.

The low molecular weight or polymeric compounds previously used as stabilizers or protective colloids have various disadvantages. Ligand stabilizers may, for example, impair the catalytic interactions of the active metal centers because of long interactions of their donor groups with the latter. For the same reason it may also be difficult to remove them from the metal core after application to a carrier. Polymeric protective colloids may impair the catalytic activity of the metal particles so that it is desirable to remove them after the immobilization. In many cases, this is possible only incompletely, if at all.

It has been found, surprisingly, that stabilizers based on polymers having betaine groups do not have these disadvantages.

The invention relates to soluble nanoparticles which comprise palladium alone or palladium together with metals of the groups 8–11 of the periodic table, and which are embedded in protective colloids, wherein the protective colloids comprise at least one polymer having betaine groups.

In a preferred embodiment of the invention, this polymer can be degraded by hydrolysis. Oxidative degradation of the stabilizer by calcination in air at 300 to 500° C. after the application to the carrier is also a preferred embodiment of the invention.

The invention furthermore relates to a process for immobilizing the nanoparticles described above in the form of thin shells on the surface or in regions near the surface of a molding, loose material or powder. In a preferred embodiment of the invention, the protective colloid is subsequently completely or partly removed by hydrolytic degradation.

The invention furthermore relates to a process for preparing soluble nanoparticles which comprise palladium alone or palladium together with metals of the groups 8–11 of the periodic table, and which are embedded in a protective colloid, by reacting a palladium compound alone or a palladium compound together with other compounds of metals of the groups 8–11 of the periodic table with a reducing agent in water or a solvent, wherein the reduction is carried out in the presence of a protective colloid comprising at least one polymer which has side chains with betaine groups and can, where appropriate, be degraded by hydrolysis, or the protective colloid is added to the sol after the reduction step. In a preferred embodiment of the invention, the stabilized sol is subsequently purified by reprecipitation and/or concentrated by evaporation.

The invention further relates to catalysts for the preparation of vinyl acetate, which comprises loading a carrier with a sol of the abovementioned nanoparticles by impregnation, spraying, dipping, imbibition, spray drying, hicoating or fluidized bed coating. In a preferred embodiment of the invention, the protective colloid is subsequently removed, for example by treatment with a base.

The soluble nanoparticles obtainable according to the invention are particles having a diameter of about 1 to 8 nanometers, preferably of about 2 to 6 nanometers, based on the metal core. The particles are soluble in water or an organic solvent, where "soluble" also means "solubilizable", i.e. forming sols. "Sol" accordingly has the same meaning herein as the term "solution of the nanoparticles".

The preparation results in the nanoparticles in the form of a solution or of a sol through reaction of a suitable compound of the required metal or the required metals with a reducing agent. Suitable starting materials are soluble compounds, in particular water-soluble salts, for example palladium(II) acetate, palladium(II) chloride, tetrachloroauric(III) acid, hexachloroplatinic(IV) acid hydrate, hexachloroiridic(IV) acid hydrate, ruthenium(III) chloride, ruthenium(III) nitrate or rhodium(III) chloride hydrate. The metal compounds are employed in concentrations of about 0.1 to 100 g per liter, preferably from 1 to 50 g per liter, based on the solvent.

Suitable reducing agents are inorganic compounds such as, for example, hydrazine, hydroxylamine, sodium hypophosphite, sodium borohydride or hydrogen. It is also possible furthermore to use organic compounds as reducing agents, for example formaldehyde, sodium hydroxymethanesulfinate, monohydric or dihydric alcohols such as ethanol or ethylene glycol. The preferred reducing agent used is sodium hydroxymethanesulfinate (Rongalit®), hydrazine or sodium borohydride. The reducing agent is employed generally in stoichiometric amounts in relation to the metal compound(s) but preferably in a certain excess. The excess can be, for example, 10 to 100%.

The novel process is carried out in water or in a mixture of water and one (or more) water-miscible organic solvent(s) or with exclusion of water in an organic solvent. Examples of suitable organic solvents are methanol, ethanol, ethylene glycol, N-methylpyrrolidone, dimethylformamide or dimethylacetamide or THF. Preference is given to the preparation of sols in water (hydrosols) or in water with the addition of 1 to 50% by weight, preferably 5 to 25%, of an organic solvent.

Polybetaines are used according to the invention as protective colloids for stabilizing the nanoparticles. They are composed of an essentially unbranched polymethylene main chain and various types of side chains having betaine groups.

The side chains consist of an alkylene radical of about 2 to about 12 carbon atoms, preferably 2 to 4 carbon atoms, and have a terminal betaine group. The side chain is linked to the main chain via a carboxylic ester group or via a carboxamide group. The side chain can also be formed by an N-containing heterocyclic ring system, for example a pyridine ring, in which case the nitrogen atom of the betaine group belongs to the ring system, and the linkage to the main chain takes place via carbon or, where appropriate, other nitrogen atoms in the ring system.

The betaine group may consist of a carbobetaine, $-\overset{\oplus}{N}R^1R^2-(-CH_2-)_n-CO_2^{\ominus}$ phosphobetaine, $-N^{\oplus}R^1R^2-(-CH_2-)_n-PO_3^{\ominus}$ or, preferably, of a sulfobetaine $-N^{\oplus}R^1R^2-(-CH_2-)_n-SO_3^{\ominus}$, where $R^1$ and $R^2$ are identical or different alkyl adicals of 1 to 6 carbon atoms and n is 1, 2 or 3.

Examples of suitable polymers are
poly-[N,N-dimethyl-N-methacryloxyethyl-N-(3-sulfopropyl)-ammonium taine] of the formula 1

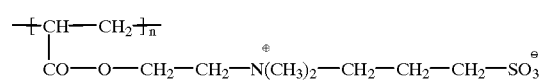

poly-[N, N-dimethyl-N-methacrylamidopropyl-N-(3-sulfopropyl)-ammonium betaine] of the formula 2

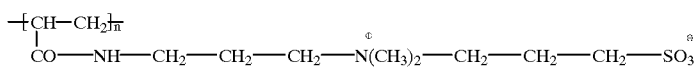

2 poly-[1-(3-sulfopropyl)-2-vinylpyridinium betaine] of the formula 3

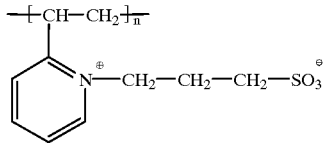

3

The polymers described above are prepared by free-radical polymerization of the appropriate monomers, which are commercially available. The polybetaines have degrees of polymerization of about 50 to 10,000, preferably from 100 to 1000.

It is also possible to employ copolymers composed of various monomers of the type described above.

It is furthermore possible to employ copolymers which are composed of monomers having betaine groups and other monomers such as, for example, acrylic acid, acrylic esters, acrylamides, vinyl carboxylates, vinyl alkyl ethers, N-vinylpyridine, N-vinylpyrrolidone, N-vinylcarboxamides. The polybetaines are employed in amounts of from 5 to 1000%, preferably from 20 to 500%, based on the weight of the metal or the metals for the novel process.

The sols are prepared at temperatures between 0 and 200° C., preferably between 20 and 100° C. It is expedient to assist the formation of the sols by stirring or sonication with ultrasound.

It is generally possible to add the metal compound(s) and the reducing agent in any sequence. In the preferred procedure, the reducing agent is added to the metal compound(s). If more than one metal compound is employed, it is possible to reduce the metal compounds successively, in which case the same reducing agent or different reducing agents can be employed for the two steps. It is possible, for example, to reduce first a gold compound and then a palladium compound. The stabilizer can be added before, during or after the reduction. If the polybetaine is added only after the reduction, the addition must take place before agglomeration starts.

To increase the stability where appropriate it is also possible to add electrolytes to the sol. Suitable examples are chlorides, bromides or iodides. The addition can in general amount to between 20 and 400 mol %, preferably between 40 and 200%.

The polybetaine-stabilized metal particles present in the sols prepared according to the invention are novel compounds with a relatively homogeneous composition. Based on transmission electron microscopic investigations (TEM), the size distribution of the resulting particles is very narrow.

For further processing of the sols to heterogeneous catalysts, i.e. for immobilization of the polybetaine-stabilized metal particles on a solid carrier, the required metal concentrations are in general at least 10 g/liter. The sols obtained according to the invention can be concentrated where appropriate by distilling off the water and/or the solvent under mild conditions. If necessary, the sols obtained according to the invention can be purified and, where appropriate, simultaneously concentrated by reprecipitation in a manner known per se. The polybetaine-stabilized metal particles can be precipitated by adding acetone or isopropanol. The resulting gels can be redissolved in water. The metal concentrations obtainable in this way are between 20 and 50 g/liter.

To prepare catalysts, the aqueous sols prepared as described above are immobilized on shaped catalyst carriers, it being possible to employ known coating techniques such as impregnation, imbibition, dipping, spraying, spray drying, hicoating, fluidized bed coating etc, which are state of the art for preparing conventional supported catalysts by loading with aqueous (atomically dispersed) salt solutions. The loading of the carrier with the noble metal sols can take place in one or more sequential steps, it being possible to insert drying phases between the individual immobilization steps.

The carrier can also be loaded with further activators, especially alkali metal acetates, preferably potassium acetate and, where appropriate, promoters, for example Zr, Ti, Cd, Cu, Ba and Re compounds, before, during and/or after the immobilization of the sols.

The stabilizer can remain on the nanoparticles after the carrier immobilization or, where appropriate, be removed if the presence of the stabilizer would interfere with the catalysis. Complete or partial removal of the stabilizer if required can take place, for example, by hydrolysis with a solvent, thermally or by oxidation, for example by burning off in air at 300–500° C., both before installation of the catalyst in the reactor and in situ in the reactor.

The carriers used are inert materials, for example porous ceramic materials such as $SiO_2$, $Al_2O_3$, $ZrO_2$, $TiO_2$ or mixtures of these oxides in the form of granules, beads, tablets, rings, stars, strands or other moldings. The diameter or the length and thickness of the carrier moldings employed is generally from 3 to 9 mm. The surface area of the shaped carriers is, measured by the BET method, generally 10–500 $m^2/g$, preferably 20–250 $m^2/g$. The pore volume is generally from 0.3 to 1.2 ml/g.

The Pd content of the Pd/Au catalysts is generally from 0.5 to 2.0% by weight, preferably 0.6 to 1.5% by weight. The Au content of the Pd/Au catalysts is generally from 0.2 to 1.0% by weight, preferably 0.3 to 0.8% by weight.

A preferred catalyst system comprises not only Pd and Au but also potassium acetate as activator. The K content is generally from 0.5 to 4.0% by weight, preferably 1.5 to 3.0% by weight. The proportions by weight are based on the total weight of the catalyst.

Suitable precursor salts for the activators and promoters are all salts which are soluble and contain no catalyst-poison constituents such as, for example, sulfur. The acetates and chlorides are preferred. In the case of the chlorides, it must be ensured that the chloride ions are removed before the use of the catalyst. This takes place by washing the loaded carrier, for example with water. A preferred embodiment consists of subsequent impregnation with potassium acetate of the carrier which has been impregnated with sol. In the novel method there is preferably firstly production of a shell of Pd/Au and then subsequent impregnation with potassium acetate solution, in which case the K is uniformly distributed over the cross-section of the pellet.

Suitable solvents for the activators and promoters are all compounds in which the chosen salts are soluble and which can easily be removed again by drying after the impregnation. Suitable for the acetates are, in particular, unsubstituted carboxylic acids, especially acetic acid. Water is particularly suitable for the chlorides. The additional use of another solvent is expedient when the salts are insufficiently soluble in acetic acid or in water. Suitable additional solvents are those which are inert and are miscible with acetic acid or water. Additions which may be mentioned for acetic acid are ketones such as acetone and acetylacetone, also ethers such as tetrahydrofuran or dioxane, acetonitrile, dimethylformamide, but also hydrocarbons such as benzene.

It is possible to apply a plurality of salts of an element, but in a preferred embodiment exactly one salt of each of the three elements is applied. The required amounts of salts can be applied in one step or by multiple impregnation. The salts can be applied to the carrier by known methods such as impregnation, spraying on, vapor deposition, dipping or precipitation.

In the case of Pd/Au/K catalysts, it has proven advantageous to apply the two noble metals in the form of a shell to the carrier, i.e. the noble metals are distributed only in a zone near the surface, whereas the regions located further inside the carrier molding are virtually free of noble metals. The layer thickness of these catalytically active shells is generally less than 2 mm, preferably less than 0.5 mm. Thinner shells would be desirable for further increases in selectivity, but can be achieved only with great difficulty, if at all, with conventional preparation methods (i.e. not according to the invention).

The process can be carried out more selectively with shell-type catalysts than with catalysts in which the carrier particles are impregnated as far as the core ("thoroughly impregnated"), likewise an enhancement of capacity.

In this case it is appropriate to leave the reaction conditions unchanged in relation to the thoroughly impregnated catalysts and to prepare more vinyl acetate per reactor volume and time. This facilitates the workup of the resulting crude vinyl acetate because the vinyl acetate content in the reactor exit gas is higher, which furthermore leads to a saving of energy in the workup part. Suitable workups are described, for example, in U.S. Pat. No. 5,066,365, DE-A 34 22 575, DE-A 34 08 239, DE-A 29 45 913, DE-A 26 10 624, U.S. Pat. No. 3,840,590. If, on the other hand, the system capacity is kept constant, the reaction temperature can be lowered and thus the reaction can be carried out more selectively with the same total output and with a saving in precursors. In this case, the amount of carbon dioxide, which results as by-product and must therefore be ejected, and the loss of entrained ethylene associated with this ejection, also becomes less. In addition, this procedure results in an increase in the service life of the catalysts.

The novel method for coating carriers with sols advantageously permits the formation even of thin shells with shell thicknesses of less than 0.5 mm and with a relatively sharply defined interface to the unloaded inner region of the moldings. Shell thicknesses of less than 0.1 mm can also be attained, depending on the particle size, stabilizer and pore structure of the carrier.

A considerable advantage of the sol-coating technique is that the noble metal components are essentially already in the reduced state after application of the sol to the carrier. This makes a reduction of the noble metals at high temperatures unnecessary, which generally causes the noble metals to sinter together and thus reduces the catalytic surface area.

Vinyl acetate is generally prepared by passing acetic acid, ethylene and oxygen or oxygen-containing gases at temperatures from 100 to 220° C., preferably 120 to 200° C., and under pressures from 1 to 25 bar, preferably 1 to 20 bar, over the finished catalyst, it being possible to recycle unreacted components. The oxygen concentration is expediently kept below 10% by volume (based on the gas mixture free of acetic acid). However, in some circumstances, dilution with inert gases such as nitrogen or carbon dioxide is also advantageous. Carbon dioxide in particular is suitable for the dilution because it is formed in small amounts during the reaction.

EXAMPLE 1

0.673 g (3.0 mmol) of palladium(II) acetate and 0.255 g (6.0 mmol) of lithium chloride are dissolved in 50 ml of hot deionized water in a 500 ml Erlenmeyer flask, and a further 250 ml of water are added. A second solution is prepared by dissolving 0.50 g of poly-[N,N-dimethyl-N-methacrylamidopropyl-N-(3-sulfopropyl)-ammonium betaine] and 0.389 g (3.33 mmol) of sodium hydroxymethanesulfonate (Rongalit®) in 20 ml of deionized water. The two solutions are combined all at once with vigorous stirring at 20–25° C. The mixture of the solutions immediately becomes dark. It is left to stand at room temperature for 15 h and the hydrosol which has formed is concentrated to a volume of 50 ml in a rotary evaporator under reduced pressure at a bath temperature of 40° C. A dark brown hydrosol which is stable for at least 5 days is obtained.

A particle size of 2–3 nanometers was found from the TEM analysis (transmission electron microscope with attached EDX system, type: Philips CM 30).

EXAMPLE 2

A solution 1 is prepared in a 2 l Erlenmeyer flask by dissolving 1.50 g (6.67 mmol) of palladium(II) acetate and 0.57 g (13.4 mmol) of lithium chloride in 100 ml of hot deionized water and adding a further 600 ml of water. Solution 2 is prepared by dissolving 0.68 g (1.72 mmol) of tetrachloroauric acid hydrate, $HAuCl_4 \times H_2O$, in 20 ml of deionized water. Solution 3 is prepared by dissolving 2.00 g of poly-[N,N-dimethyl-N-ethylacryloxyethyl-N-(3-sulfopropyl)-ammonium betaine] and 1.31 g (11.1 mmol) of sodium hydroxymethanesulfinate (Rongalit®) in 100 ml of deionized water. Firstly solution 1 and solution 2 are combined and, at 20–25° C., solution 3 is added all at once while stirring vigorously. The mixture of the solutions immediately becomes dark. It is left to stand at room temperature for 15 h and the hydrosol which has formed is concentrated to a volume of 100 ml in a rotary evaporator under reduced pressure at a bath temperature of 40° C. A dark reddish brown hydrosol which is stable for at least 5 days is obtained.

A particle size of 2–5 nanometers was found from the TEM analysis (transmission electron microscope with attached EDX system, type: Philips CM 30). The EDX measurement showed a Pd/Au atomic ratio of 4:1 (average of several measurements; in each case 3–5 clusters lying next to one another were measured).

EXAMPLE 3

Solution 1 and solution 2 are prepared as described in Example 2. Solution 3 is prepared by dissolving 2.00 g of poly-[N,N-dimethyl-N-methylacrylamidopropyl-N-(3-sulfopropyl)-ammonium betaine] and 1.31 g (11.1 mmol) of sodium hydroxymethanesulfinate (Rongalit®) in 100 ml of deionized water. The remaining procedure is as described in Example 2, and a dark reddish brown hydrosol which is stable for at least 5 days is obtained.

A particle size of 3–8 nanometers was found from the TEM analysis (transmission electron microscope with attached EDX system, type: Philips CM 30). The EDX measurement showed a Pd/Au atomic ratio of 3.55:1 (average of several measurements; in each case 3–5 clusters lying next to one another were measured).

EXAMPLE 4

Solution 1 is prepared by dissolving 1.50 g (6.67 mmol) of palladium(II) acetate and 0.57 g (13.4 mmol) of lithium chloride in 100 ml of hot deionized water and adding a further 600 ml of water. Solution 2 is prepared as described in Example 2. Solution 3 is prepared by dissolving 1.00 g of poly-[1-(3-sulfopropyl)-2-vinylpyridinium betaine] and 1.31 g (11.1 mmol) of sodium hydroxymethanesulfinate (Rongalit®) in 100 ml of deionized water. The remaining procedure is as described in Example 2, and a dark reddish brown hydrosol which is stable for at least 5 days is obtained.

A particle size of 2–8 nanometers was found from the TEM analysis (transmission electron microscope with attached EDX system, type: Philips CM 30). The EDX measurement showed a Pd/Au atomic ratio of 4:1 (average of several measurements; in each case 3–5 clusters lying next to one another were measured).

EXAMPLE 5

2.4 g of polyvinyl alcohol (22,000 from Fluka) are dissolved in 1200 ml of water by boiling briefly and allowing to cool to RT. A second solution is prepared by dissolving 3 g (13.33 mmol) of palladium(II) acetate and 1.27 g (30.0 mmol) of lithium chloride in 200 ml of hot deionized water. The solution is filtered and washed with PVA solution. A third solution is prepared by dissolving 1.36 g of tetrachloroauric acid hydrate (3.44 mmol) in 40 ml of water.

The three solutions made up above are mixed in a 2 l Erlenmeyer flask. A clear dark reddish brown solution in which all the substances are dissolved is produced. Then 2.62 g (22.2 mmol) of sodium hydroxymethanesulfinate dihydrate (Rongalit®)in 40 ml of deionized water are added all at once at 20–25° C. while stirring vigorously. The mixture of the solutions immediately becomes dark. It is left to stand at room temperature for 15 h, and the hydrosol which has formed is concentrated to 250 g in a rotary evaporator under reduced pressure at a bath temperature of 40° C.

EXAMPLE 6

3 g (13.33 mmol) of palladium(II) acetate and 1.27 g (30 mmol) of lithium chloride are dissolved in 200 ml of hot deionized water in a 2 l Erlenmeyer flask. The solution is filtered and diluted to 1200 ml. A second solution is prepared by dissolving 1.36 g of tetrachloroauric acid hydrate (3.44 mmol) in 40 ml of water.

The two solutions made up above are mixed. A clear dark reddish brown solution is obtained. Then a solution of 2 g of poly-[N,N-dimethyl-N-methylacryloxyethyl-N-(3-sulfopropyl)-ammonium betaine] and 2.62 g (22.2 mmol) of sodium hydroxymethanesulfinate dihydrate (Rongalit®) in 40 ml of deionized water is added all at once at 20–25° C. while stirring vigorously. The mixture of the solutions immediately becomes dark. It is left to stand at room temperature for 15 h, and the hydrosol which has formed is concentrated to 250 g in a rotary evaporator under reduced pressure at a bath temperature of 40° C.

EXAMPLE 7

3 g (13.33 mmol) of palladium(II) acetate and 1.27 g (30 mmol) of lithium chloride are dissolved in 200 ml of hot deionized water in a 2 l Erlenmeyer flask. The solution is filtered and diluted to 1200 ml. A second solution is prepared by dissolving 1.36 g of tetrachloroauric acid hydrate (3.44 mmol) in 40 ml of water.

The two solutions made up above are mixed. A clear dark reddish brown solution is obtained. Then a solution of 2 g of poly-[N,N-dimethyl-N-methylacrylamidopropyl-N-(3-sulfopropyl)-ammonium betaine] and 2.62 g (22.2 mmol) of sodium hydroxymethanesulfinate dihydrate (Rongalit®) in 40 ml of deionized water is added all at once at 20–25° C. while stirring vigorously. The mixture of the solutions immediately becomes dark. It is left to stand at room temperature for 15 h, and the hydrosol which has formed is concentrated to 250 g in a rotary evaporator under reduced pressure at a bath temperature of 40° C.

EXAMPLE 8

The initial solution from Example 5 with a concentration of 1.41 g of Pd and 0.68 g of Au in 250 ml of solution is used. 100 ml of the initial solution are taken and diluted to 300 ml with water and sprayed with a spray gun (0.5 mm nozzle) with $N_2$ as propellant gas onto 100 g of beads (Siliperl AF 125, screen fraction with diameter 4 mm). It is washed free of chloride in a Soxhlet and dried at 100° C. overnight. It is then impregnated with potassium acetate by adding a solution of 6 g of potassium acetate in 72 ml of water (corresponding to the water taken up by the beads) to 100 ml of beads. Mixing is carried out for 1 h, rotating continuously, and drying takes place in a drying oven at 120° C. overnight.

EXAMPLE 9

60 g of Siliperl AF 125 (supplied by Engelhard) are impregnated with 75 ml of the initial solution from Example 6 (corresponds to 0.63 g of Pd and 0.19 g of Au, stabilized with polymeric sulfobetaine). Absorption is allowed to take place while rotating continuously. Drying takes place in a drying oven at 110° C. overnight. Washing with 4 l of water for one day is followed by renewed drying in a drying oven at 110° C. overnight. 4.8 g of potassium acetate are dissolved in 60 ml of water (corresponding to the water taken up by the carrier) and together added to the beads. Absorption is allowed to take place while rotating continuously. Drying takes place at 110° C. overnight.

EXAMPLE 10

60 g of Siliperl AF 125 are impregnated with 75 ml of the initial solution from Example 7 (corresponds to 0.63 g of Pd and 0.19 g of Au, stabilized with polymeric sulfobetaine). Absorption is allowed to take place while rotating continuously. Drying takes place in a drying oven at 110° C. overnight. Washing with 4 l of water for one day is followed by renewed drying in a drying oven at 110° C. overnight. 4.8 g of potassium acetate are dissolved in 60 ml of water (corresponding to the water taken up by the carrier) and together added to the beads. Absorption is allowed to take place while rotating continuously. Drying takes place at 110° C. overnight.

EXAMPLE 11

20 g of catalyst from Example 9 are kept at 350° C. in synthetic air for 4 h. After cooling, reduction is carried out with ethylene at 150° C. for 2 h. Cooling is followed by passivation with 1% oxygen at RT for 10 minutes, and the passivated catalyst is stored until measured.

EXAMPLE 12

The procedure was the same as in Example 11 with the only difference being that calcination took place at 450° C.

EXAMPLE 13

The procedure was the same as in Example 11 with the only difference being that calcination took place at 550° C.

Reactor tests for the gas-phase oxidation of ethylene and acetic acid to vinyl acetate:

The catalysts were tested in a fixed bed tubular reactor with 2 cm diameter tube. The reactor temperature is maintained by external heating with an oil-filled jacket. 15 ml of the catalyst moldings are introduced. The reactor volume upstream and downstream of the catalyst bed is filled with glass beads. The test apparatus is controlled by a process control system and is operated continuously. The catalyst is initially activated and then tested under constant reaction conditions. Activation consists of several steps: Heating under $N_2$, addition of ethylene, raising the pressure, addition of acetic acid, maintaining the conditions, addition of oxygen. The reaction conditions in the tests are a reaction temperature of 160–170° C., a gauge pressure of 8–9 bar. The feed composition is 64.5% by volume ethylene, 16.1% by volume $N_2$, 14.3% by volume acetic acid and 5.1% by volume $O_2$. The discharge from the reactor is completely analyzed at the reactor outlet by means of on-line GC (2-column setting). The reactor results are to be found in the following Table 1 (VAM=vinyl acetate monomer):

TABLE 1

| Example No. | T (° C.) | p (bar) | GC analysis of the reactor discharge (in % area) | | | | | |
|---|---|---|---|---|---|---|---|---|
| | | | $CO_2$ | $C_2H_4$ | $O_2$ | $N_2$ | $H_2O$ | VAM | Acetic acid |
| 8 | 160 | 9 | 0.01 | | | | | 0.07 | |
| 9 | 160 | 9 | 0.01 | | | | | 0.05 | |
| 10 | 160 | 9 | 0.01 | | | | | 1.17 | |
| Subsequently calcined in air to burn off the stabilizer: | | | | | | | | | |
| 11 | 160 | 9 | 0.02 | | | | | 0.22 | |
| 12 | 160 | 9 | 0.02 | | | | | 0.25 | |
| 13 | 160 | 9 | 0.0 | | | | | 0.0 | (completely inactive) |

Note: The concentrations of the other gases ($C_2H_4$, $O_2$, $N_2$, acetic acid) correspond approximately to the initial values, any changes are within the range of the on-line GC analysis so that no values are indicated in the table.

What is claimed is:

1. Nanoparticles, soluble in water or in a mixture of water and one or more water miscible organic solvents or with the exclusion of water in an organic solvent, which comprise palladium alone or palladium in addition with the other metals of the groups 8–11 of the periodic table and which are embedded in protective colloids, wherein the protective colloids comprise at least one polymer having betaine groups.

2. The nanoparticles as claimed in claim 1, which comprise at least one polymer which has betaine groups and can be degraded by hydrolysis.

3. The nanoparticles as claimed in claim 1, which have diameters of from 1 to 8 nm.

4. The nanoparticles as claimed in claim 1, which comprise at least one polymer which has betaine groups and which has a side chain which consists of an alkylene radical having about 2 to 12 carbon atoms.

5. The nanoparticles as claimed in claim 3, which have a diameter of from 2 to 6 nm.

6. The nanoparticles as claimed in claim 4, which comprises at least one polymer which has betaine groups and which has a side chain which consists of an alkylene radical having about 2 to 4 carbon atoms.

7. The nanoparticles as claimed in claim 1, which comprise at least one polymer which has betaine groups and which has an average number of monomers in the polymer molecule of from 50 to 10,000.

8. The nanoparticles as claimed in claim 1, which comprise a polymer which comprises betaine groups and further comprises monomers selected from the group consisting of acrylic acid, acrylic esters, acrylamides, vinyl carboxylates, vinyl alkyl ethers, N-vinylpyridine, N-vinylpyrrolidone, and N-vinyl carboxamides.

9. A process for the preparation of the nanoparticles as claimed in claim 1 comprising reacting a palladium compound alone or a palladium compound together with compounds of other metals of the groups 8–11 of the periodic table with a reducing agent in water or in a mixture of water and one or more water-miscible organic solvents or with the exclusion of water in an organic solvent, wherein the reduction is carried out in the presence of a protective colloid comprising at least one polymer which has side chains with a betaine group, or the protective colloid is added after the reduction step to the resulting sol product.

10. The process as claimed in claim 9, wherein the sol is purified by reprecipitation or concentrated by evaporation.

11. The process as claimed in claim 9, wherein the preparing the soluble nanoparticles are soluble compounds, in particular water-soluble palladium compounds and compounds of other metals of the proups 8–11 of the periodic table for preparing nanoparticles, soluble in water or in a mixture of water and one or more water-miscible organic solvents or with the exclusion of water in an organic solvent, are palladium(II) acetate, palladium(II) chloride, tetrachloroauric(II) acid, hexachloroplatinic(IV) acid hydrate, hexachloroiridic(IV) acid hydrate, ruthenium(III) chloride, ruthenium(III) nitrate or rhodium(III) chloride hydrate.

12. The process as claimed in claim 9, wherein the palladium compounds and compounds of other metals of the groups 8–11 of the periodic table are employed in concentrations of about 0.1 to 100 g per liter of solvent.

13. The process as claimed in claim 9, wherein the reducing agents used are inorganic compounds or organic compounds.

14. The process as claimed in claim 9, wherein the reducing agent is used in stoichiometric amounts in relation to the metal compound(s).

15. The process as claimed in claim 9, wherein the solvent is methanol, ethanol, ethylene glycol, N-methylpyrrolidone, dimethylformamide, dimethylacetamide or tetrahydrofuran, or a mixture of these substances with water.

16. The process as claimed in claim 9, which is carried out at temperatures of from 0 to 200° C.

17. A sol prepared by the process as claimed in claim 9, which further comprises electrolytes.

18. A catalyst for the preparation of vinyl acetate, wherein a catalyst carrier is loaded with a sol of the nanoparticles as claimed in claim 1 by impregnation, spraying, dipping, imbibition, spray drying, hicoating or fluidized bed coating.

19. A catalyst as claimed in claim 18, wherein the protective colloid is removed by treatment with a base.

20. A catalyst as claimed in claim 18, which additionally comprises one or more metals selected from the group consisting of Zr, Ti, Ba and Re.

21. A catalyst as claimed in claim 18, wherein the protective colloid is removed by oxidative degradation by calcination in air at 300–500° C.

22. The nanoparticles as claimed in claim 1, wherein the betaine is a carbobetaine of the formula —$N^{\oplus}R^1R^2(CH_2)_nCO_2^{\ominus}$, a phosphobetaine of the formula —$N^{\oplus}R^1R^2(CH_2)_nPO_3^{\ominus}$, or a sulfobetaine of the formula —$N^{\oplus}R^1R^2(CH_2)_nSO_3^{\ominus}$, where $R^1$ and $R^2$ independently of one another is identical or different and are alkyl radicals of 1 to 6 carbon atoms, and n is 1, 2 or 3.

23. The nanoparticles as claimed in claim 1, wherein the protective colloids are compounds of the formulae

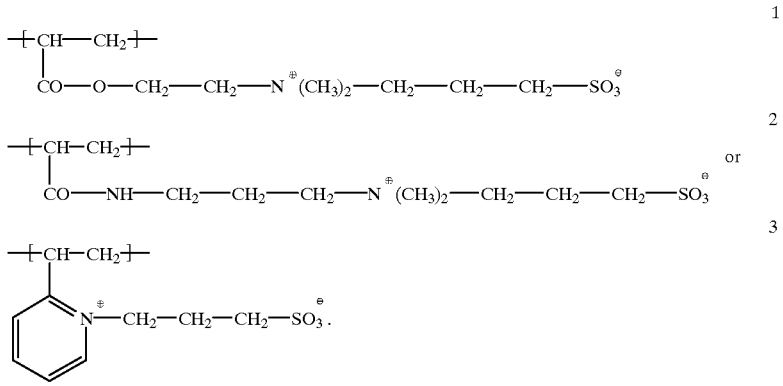

24. The process as claimed in claim 16, which is carried out at temperatures of 20 to 100° C.

25. A sol as claimed in claim 17, which comprises chlorides, bromides or iodides as electrolytes.

26. The nanoparticles as claimed in claim 22, wherein said betaine is a sulfobetaine.

27. The nanoparticles as claimed in claim 7, which comprise at least one polymer which has betaine groups and which has an average number of monomers in the polymer molecule of from 100 to 1000.

28. The process as claimed in claim 12, wherein the palladium compounds and the compounds of other metals of the groups 8–11 of the periodic table are employed in concentrations of about 1 to 50 g per liter of solvent.

29. The process as claimed in claim 13, wherein the inorganic compounds are selected from the group consisting of hydrazine, hydroxylamine, sodium hypophosphite, sodium borohydride and hydrogen.

30. The process as claimed in claim 13, wherein the organic compounds are selected from the group consisting of formaldehyde, sodium hydroxymethane sulfinate, monohydric and dihydric alcohols.

31. The process as claimed in claim 30, wherein the monohydric alcohol is ethanol and the dihydric alcohol is ethylene glycol.

32. The process as claimed in claim 9, wherein the reducing agent is used in an excess of from 10 to 100% of the stoichiometric amounts in relation to the metal compound(s).

* * * * *

UNITED STATES PATENT AND TRADEMARK OFFICE
CERTIFICATE OF CORRECTION

PATENT NO.    : 6,074,979  
DATED         : June 13, 2000  
INVENTOR(S)   : Hagemeyer et al.

Page 1 of 1

It is certified that error appears in the above-identified patent and that said Letters Patent is hereby corrected as shown below:

Column 14,  
Line 27, of the Patent, change "tetrachloroauric(II) acid" to --tetrachloroauric(III) acids --.

Signed and Sealed this

Fourteenth Day of August, 2001

Attest:

*Attesting Officer*

NICHOLAS P. GODICI  
*Acting Director of the United States Patent and Trademark Office*